US012266861B2

(12) United States Patent
Tamasy et al.

(10) Patent No.: US 12,266,861 B2
(45) Date of Patent: Apr. 1, 2025

(54) INTEGRATED ADDITIVELY MANUFACTURED MODULAR APERTURE ANTENNA

(71) Applicant: BAE SYSTEMS Information and Electronic Systems Integration Inc., Nashua, NH (US)

(72) Inventors: Jacob Tamasy, Nashua, NH (US); Matthew A. Cerniway, Madison, AL (US); Alexander D. Johnson, Waltham, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 188 days.

(21) Appl. No.: 18/170,862

(22) Filed: Feb. 17, 2023

(65) Prior Publication Data

US 2024/0283134 A1 Aug. 22, 2024

(51) Int. Cl.

| | |
|---|---|
| ***H01Q 21/06*** | (2006.01) |
| ***H01Q 5/25*** | (2015.01) |
| ***H01Q 9/28*** | (2006.01) |
| ***H01Q 21/00*** | (2006.01) |

(52) U.S. Cl.

CPC ............. *H01Q 21/062* (2013.01); *H01Q 5/25* (2015.01); *H01Q 9/28* (2013.01); *H01Q 21/0087* (2013.01)

(58) Field of Classification Search

CPC ........ H01Q 5/25; H01Q 9/28; H01Q 21/0087; H01Q 21/062

See application file for complete search history.

(56) References Cited

U.S. PATENT DOCUMENTS

| | | | | |
|---|---|---|---|---|
| 10,320,088 | B1 | 6/2019 | Johnson et al. | |
| 10,333,230 | B2 | 6/2019 | Elsallal et al. | |
| 10,840,593 | B1 | 11/2020 | Johnson et al. | |
| 2010/0126010 | A1* | 5/2010 | Puzella ................ | H05K 1/0251 333/33 |
| 2014/0287155 | A1 | 9/2014 | Matsumoto | |

(Continued)

FOREIGN PATENT DOCUMENTS

WO WO-2018236821 A1 * 12/2018 ............... H01Q 1/40

OTHER PUBLICATIONS

International Search Report, PCT/US24/15497, mailed May 7, 2024, 15 pages.

(Continued)

*Primary Examiner* — Daniel Munoz

(74) *Attorney, Agent, or Firm* — Gary McFaline

(57) ABSTRACT

A device includes a frame and at least one printed circuit board attached to the frame. The frame includes an integrated aperture antenna array and an antenna feed in electrical communication with the at least one printed circuit board. The integrated aperture antenna array further includes a first conductive dipole arm in planar alignment with a surface of the frame; a second conductive dipole arm in planar alignment with the surface of the frame and adjacent to the first conductive dipole arm; a first feedline in electrical communication with the first conductive dipole arm and the antenna feed; a second feedline in electrical communication with the second conductive dipole arm and the surface of the frame; and a shorting arm in electrical communication with second conductive dipole arm and the frame.

8 Claims, 7 Drawing Sheets

(56) References Cited

U.S. PATENT DOCUMENTS

| | | | |
|---|---|---|---|
| 2016/0248143 A1 | 8/2016 | Hensarling et al. | |
| 2016/0365641 A1 | 12/2016 | Mayer et al. | |
| 2017/0025767 A1 | 1/2017 | Elsallal et al. | |
| 2019/0115643 A1 | 4/2019 | Khan et al. | |
| 2022/0197226 A1 | 6/2022 | Yang et al. | |
| 2022/0328968 A1 | 10/2022 | Johnson et al. | |
| 2024/0283154 A1* | 8/2024 | Johnson | H01Q 21/062 |

OTHER PUBLICATIONS

The MITRE Corporation. "ASI to Launch Cubesat Demo That Could Lead to Quicker Access to Satellite Data", (May 28, 2019), 3 pages.

Carvalho, et al, "Semi-Resistive Approach for Tightly Coupled Dipole Array Bandwidth Enhancement", IEEE Open Journal of Antennas and Propagation, Dec. 25, 2020, 8 pages.

Johnson, et al, "Phased Array with Low Angle Scanning and 46:1 Bandwidth", IEEE Transactions on Antennas and Propagation, IEEE Xplore, retrieved Jun. 17, 2020, 9 pages.

Targonski, et al, "Design of Wide-Band Aperture-Stacked Patch Microstrip Antennas", IEEE Transactions on Antennas and Propagation, vol. 46, No. 9, Sep. 1998, 7 pages.

Logan, et al, "A New Class of Planar Ultrawideband Modular Antenna Arrays With Improved Bandwidth", IEEE Transactions on Antennas and Propagation, vol. 66, No. 2, Feb. 2018, 10 pages.

Holland, et al, "A 7-21 GHz Dual-Polarized Planar Ultrawideband Modular Antenna (PUMA) Array", IEEE Transactions on Antennas and Propagation, vol. 60, No. 10, Oct. 2012, 12 Pages.

Sekelsky, et al, "Ultra-wideband Dual-Polarized Scanning Metamaterial / Meta-ferrite Arrays", IEEE Xplore, retrieved Jun. 17, 2020, 4 pages.

Doane, et al, "A Wideband, Wide Scanning Tightly Coupled Dipole Array With Integrated Balun (TCDA-IB)", IEEE Transactions on Antennas and Propagation, vol. 61, No. 9, Sep. 2013, 11 pages.

* cited by examiner

INTEGRATED ADDITIVELY MANUFACTURED MODULAR APERTURE ANTENNA

FIELD OF DISCLOSURE

The present disclosure relates to electronics, and more particularly, to an integrated additively manufactured modular aperture antenna and antenna array.

BACKGROUND

An aperture antenna is a type of antenna that emits electromagnetic (EM) waves through an aperture. The aperture is typically considered to include a portion of a surface of the antenna through which a majority of the EM waves are transmitted or received. Aperture antennas can be arranged in arrays to provide wideband and ultra-wideband (UWB) operations, such as in conjunction with radar and tracking systems, high data rate communication links, and multi-waveform, multi-function front end systems. The aperture antenna can be manufactured as a stand-alone component of a larger mechanical system, such as within an electronics package of a device.

Figure 1A:
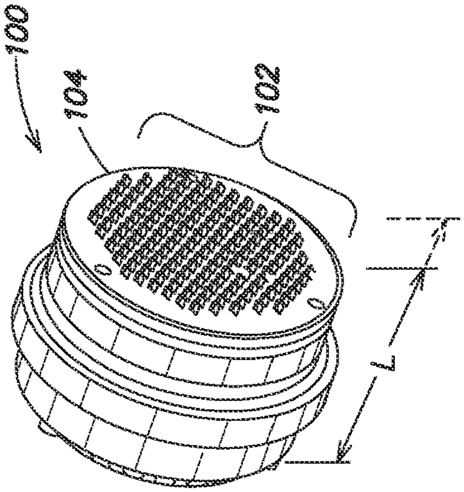
FIGS. 1A-B are assembled and exploded perspective views of an integrated additively manufactured aperture antenna array, in accordance with an example of the present disclosure.

Although the following detailed description will proceed with reference being made to illustrative examples, many alternatives, modifications, and variations thereof will be apparent in light of this disclosure.

DETAILED DESCRIPTION

In accordance with an example of the present disclosure, a device includes a frame and at least one printed circuit board attached to the frame. The frame includes an integrated aperture antenna array and an antenna feed in electrical communication with the at least one printed circuit board. The antenna feed is configured to receive a signal over a wide bandwidth. The integrated aperture antenna array further includes a first conductive dipole arm in planar alignment with a surface of the frame, and a second conductive dipole arm in planar alignment with the surface of the frame and adjacent to the first conductive dipole arm. A first feedline is in electrical communication with the first conductive dipole arm and the antenna feed. A second feedline is in electrical communication with the second conductive dipole arm and the surface of the frame. A shorting arm is in electrical communication with second conductive dipole arm and the frame.

Overview

As noted above, aperture antennas can be manufactured as stand-alone components of a larger mechanical system, such as within the electronics package of a device. Devices that utilize a spatial aperture antenna array can be assembled by attaching the antenna array sub-component to a frame of a larger electro-mechanical assembly. The frame provides both structural support and environmental protection to the electronic components. However, manufacturing the antenna array sub-component separately from other components, such as the frame and/or one or more sensors in the device, introduces additional complexity in the procurement, alignment, assembly, and operation of the antenna to the various system components.

By contrast, examples of the present disclosure include additively manufacturing an aperture antenna array directly into a device, such as an electronics package, frame, or housing, which improves the alignment of the antenna to a desired location within the device or system by removing the tolerances of the alignment features. Integrating the antenna with the device through additive manufacturing techniques reduces the number of separate parts and assembly steps. Furthermore, the disclosed techniques can utilize a superstrate of a circuit card assembly (CCA) frame as part of the antenna structure. The inclusion of a superstrate, which can take the form of a printed circuit board (PCB), aids in the antennas match by dielectrically loading the aperture. Directly integrating the aperture antenna array into the device can be achieved using two distinct technologies: Additive Manufacturing Modular Array (AMMA) Tightly Coupled Dipole Arrays (TCDA), and high resolution, metal additive manufacturing (e.g., less than or equal to one-third of the smallest structural feature and having an Ra less than or equal to 125 μin).

Example Aperture Antenna

Figure 1B:
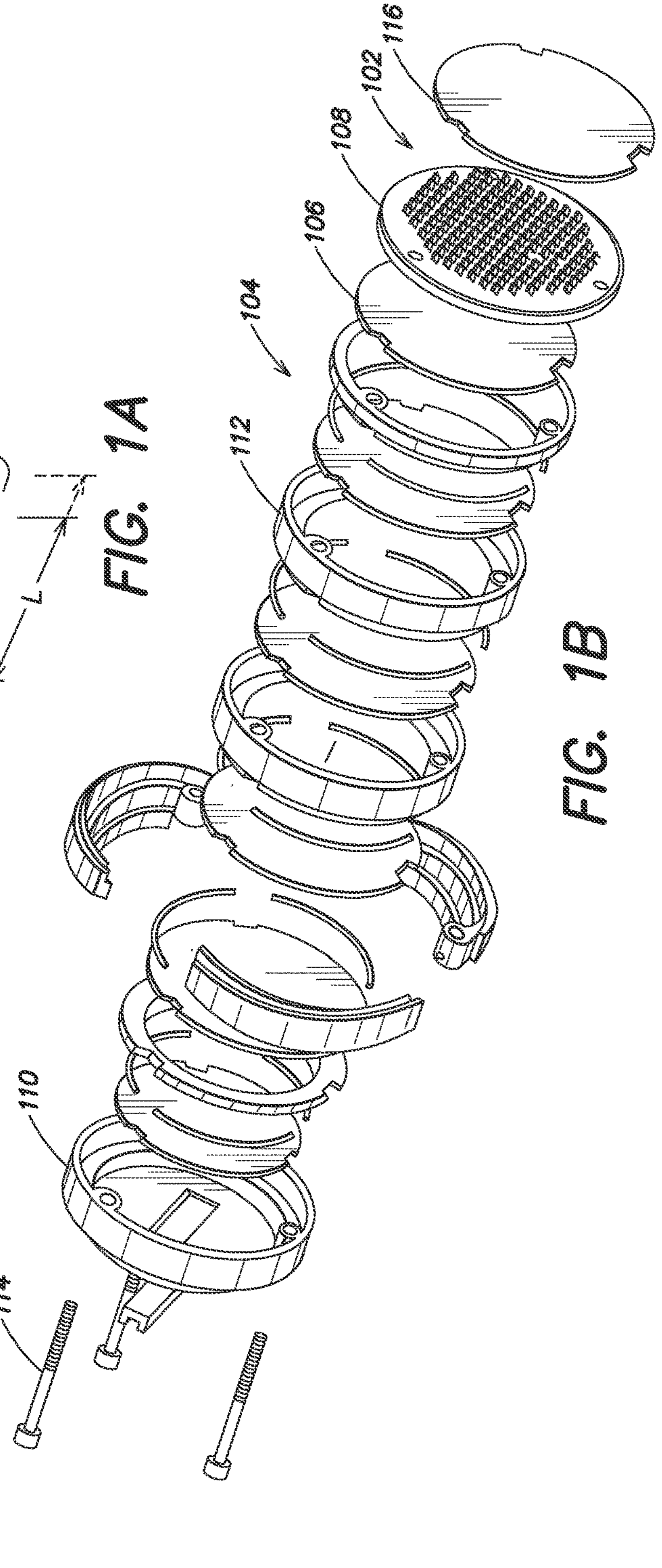

FIGS. 1A-B are assembled and exploded perspective views of a device 100 with an integrated additively manufactured aperture antenna array 102, in accordance with an example of the present disclosure. The device 100 includes a circuit card assembly (CCA) frame 104 with the aperture antenna array 102 integrated therein. In some examples, the aperture antenna array 102 is manufactured using Binder Jet 3D Printing (BJ3DP), which is a non-beam based additive manufacturing method that allows for accurate reproduction of AMMA features up to the Ka-Band (40 GHz). When constructed from metal, the AMMA features can be incorporated into the frame 104, which is metallic for structural and thermal purposes. In some examples, the aperture antenna array 102 is integrated with a planar surface of the frame 104. However, it will be appreciated that examples of the disclosed embodiments are not limited to planar surface implementation.

Referring to FIG. 1B, the device 100 includes one or more printed circuit boards (PCBs) 106, a frame 104 having a frame cap 108, a frame base 110, one or more frame couplers 112, and one or more assembly keys 114. The assembly keys 114 are configured to attach the frame cap 108, the frame couplers 112, the PCBs 106, and the frame base 110 together. In this example, the aperture antenna array 102 is integrated into the frame cap 108, although it will be understood that the aperture antenna array 102 can be integrated into or attached to any portion of the frame 104 structure, including the frame base 110 or other structure of the frame 104 (not necessarily shown). The aperture antenna array 102 is manufactured via an additive manufacturing process. In this example, integration of the aperture antenna array 102 into the frame cap 108 permits the overall length/ of the device 100 to be shortened through the exclusion of array-specific sub-components and attachment mechanisms. In addition to shorter length, the device 100 benefits from use of the assembly keys 114, such as socket head cap screws, reducing another uncertainty parameter. The TCDA implementation of the aperture antenna array 102 allows for extended bandwidth and electronic beam steering.

Figure 2A:
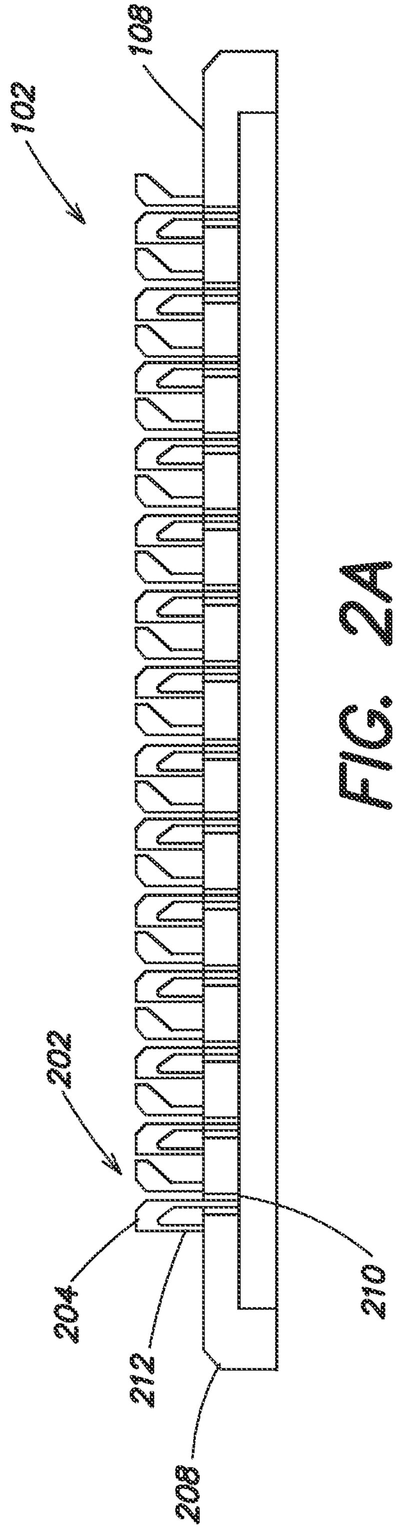
FIGS. 2A-C show an example of a portion of the aperture antenna array of FIGS. 1A-B, in accordance with an example of the present disclosure.
Figure 2B:
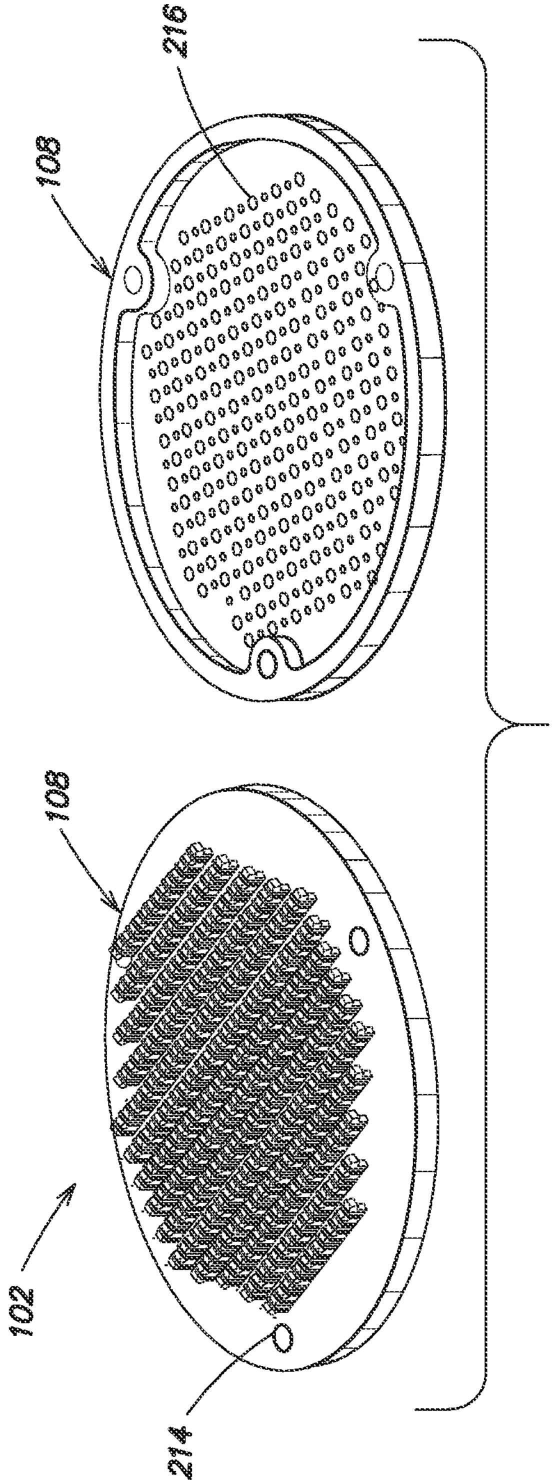
Figure 2C:
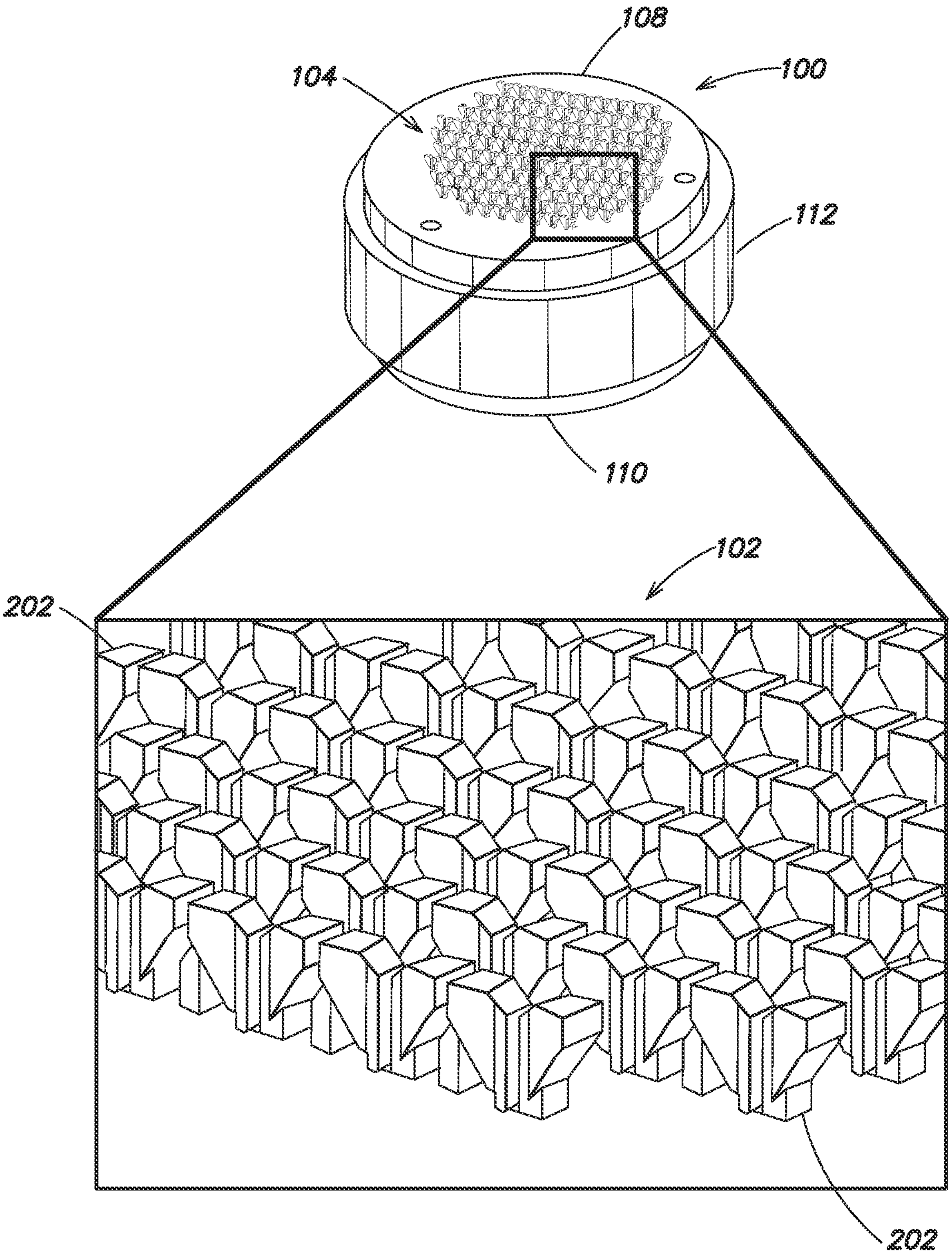

FIGS. 2A-C show an example of the frame cap 108 of FIGS. 1A-B in further detail. The aperture antenna array 102 includes a plurality of unit cells 202. The aperture antenna array 102 can, in some examples, include multiple unit cells arrayed together, such as 3×3, 6×6, etc., where each unit cell is similar to the 1×1 unit cell 502 shown in FIG. 5. In any event, the aperture antenna array 102 includes one or more 1×1 unit cells 202.

Each unit cell 202 includes an antenna element 204, a ground plane 208 on a surface of the frame cap 108 or other portion of the frame 104, and at least one antenna feed 210 passing through the frame cap 108 or other portion of the frame 104. In some examples, an opening in the frame 104 through which the at least one antenna feed 210 passes through can be hermetically sealed to broaden the environmental applications of the device 100. The at least one antenna feed 210 is configured to receive a signal over a wide bandwidth. Each unit cell 202 further includes a shorting arm 212 for common mode rejection. The shorting arm 212 is electrically conductive and further provides structural support for the unit cell 202.

In some examples, the frame cap 108 includes one or more threaded holes 214 to preload the assembly. In some examples, the underside of the frame cap 108 incorporates soldering features 216 for soldering the at least one antenna feed 210 to the PCB 106. The spacing between the soldering features 216 can be varied to allow for surface-mount technology (SMT) components to reside on the array side of the mating PCB 106.

FIG. 2C shows a magnified view of a portion of the aperture antenna array 102 mounted on the frame cap 108. In some examples, each unit cell 202 is aligned with one or more other unit cells 202 in rows and/or columns. Other arrayed arrangements of the unit cells 202 are possible.

In some examples, the PCB 106 can be a dual sided board. For example, surface mounted technology (SMT) components that are smaller than the pitch (spacing) of the antenna feeds 210 of the aperture antenna array 102 can be placed on the same side of the board as the antenna feeds 210 by printing in recesses in the bottom of the frame cap 108, although it will be understood that the components that are larger than the pitch can also be placed on the same side of the board as the antenna feeds using other mounting techniques. This increases the potential SMT component count on components near or between the antenna feeds 210. In some examples, additive manufacturing can be used to route the antenna feed 210 through the ground plane (e.g., frame cap 108) to increase space for integrated components and or surface-mounted technology on the array side of the PCB 106. Some examples utilize additively manufactured structures as heat sinks for the integrated circuits on the PCB 106.

Example TCDA

Figure 3:
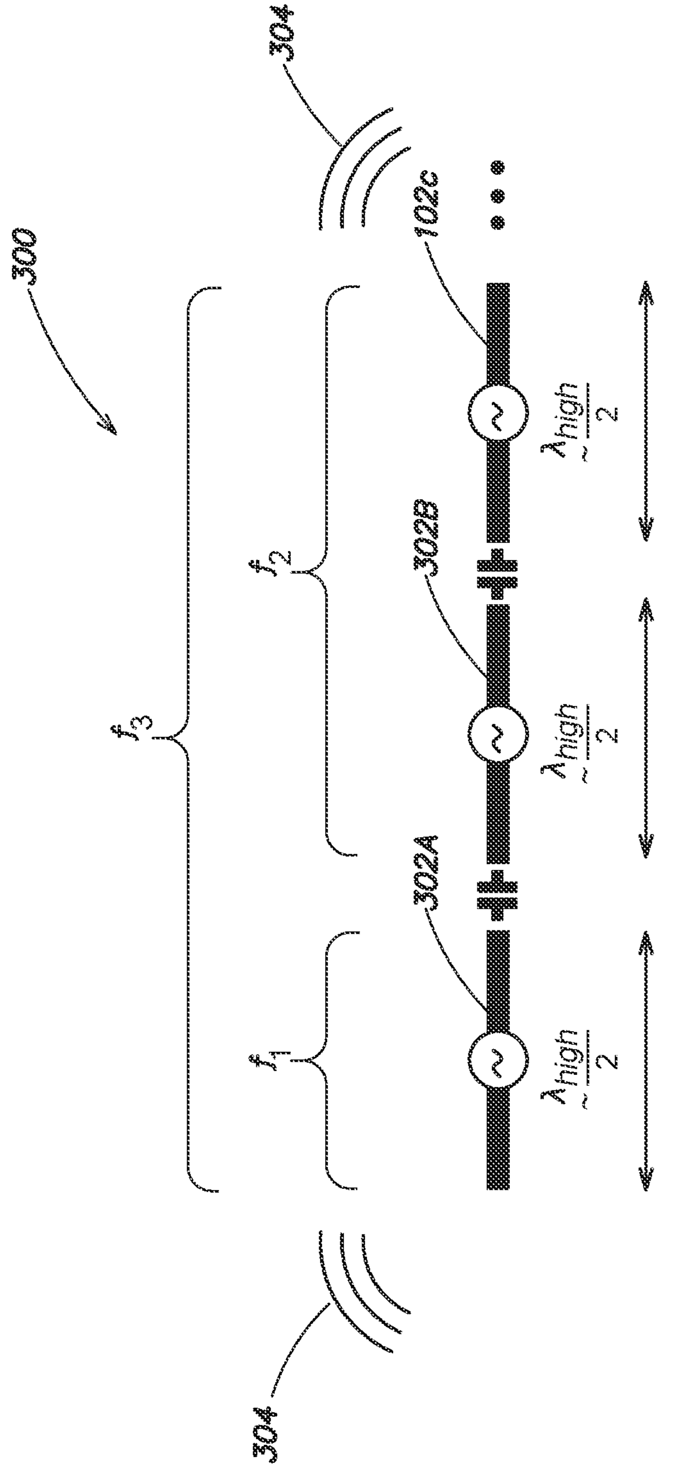
FIG. 3 is a schematic diagram of a tightly coupled dipole array (TCDA), in accordance with an embodiment of the present disclosure.

By way of further explanation, FIG. 3 is a schematic diagram of a TCDA 300, in accordance with an embodiment of the present disclosure. The TCDA 300 includes multiple half wave dipole antennas 302*a*, 302*b*, 302*c*, etc. Each dipole antenna 302*a*, 302*b*, 302*c*, can radiate or receive a signal 304 at a frequency of approximately $$\frac{\lambda_1}{2}, \frac{\lambda_2}{2}, \text{ and } \frac{\lambda_3}{2},$$

respectively. An individual dipole antenna, such as dipole antenna 302*a*, radiates or receives a signal at a frequency $f_1$. The dipole antennas 302*a*, 302*b*, 302*c* can be located or arrayed adjacent to each other to radiate or receive signals at frequencies $f_2$, $f_3$, etc., such as shown in FIG. 3. Such an arrangement approximates a flat current distribution across all of the dipole antennas 302*a*, 302*b*, 302*c*.

Figure 4:
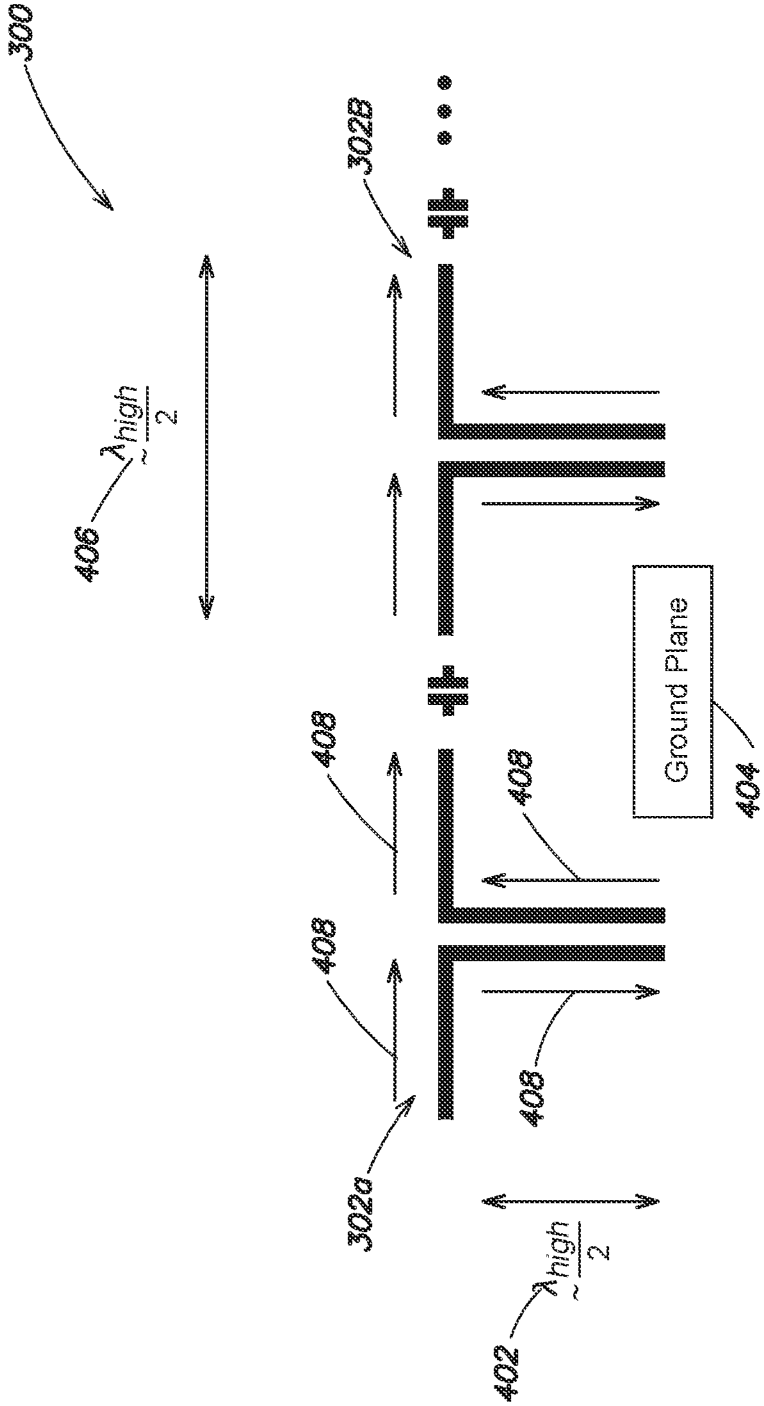
FIG. 4 is another schematic diagram of the TCDA of FIG. 3, in accordance with an example of the present disclosure.

FIG. 4 is another schematic diagram of the TCDA 300 of FIG. 3, in accordance with an example of the present disclosure. The upper cutoff frequency of the TCDA 300 is established by the height 402 of the dipole elements above a ground plane 404 and a pitch (width) 406 of each of the antennas 302*a*, 302*b*. The lower cutoff frequency can be extended by coupling each of the antennas 302*a*, 302*b* and through the use of lower dielectrics in the substrate.

Antennas can be balanced or unbalanced and be of single polarization or dual polarization. Some existing TCDAs have wideband, single-ended (unbalanced) feeds. A single-ended feed antenna is considered unbalanced because the feed signal is not symmetrical about the point at which the feed meets the conductive element(s) of the antenna that radiate or absorb EM power. For example, in a dipole arrangement, one dipole arm is energized by the signal while the other dipole arm is shorted to a ground potential. By contrast, a balanced feed antenna has complementary signals 408 in the adjacent conductive elements, such as shown in FIG. 4.

However, balanced and unbalanced antennas can suffer from distortions caused by common mode noise, power supply noise, or electromagnetic interference, each of which affects antenna performance. For example, a signal radiating from one or more of the dipole antennas 302*a*, 302*b* can excite a common mode resonance upon the balanced feed of the adjacent dipole antenna(s) 302*a*, 302*b* when scanning in the ground plane 404 over a wide or ultra-wideband frequency range. The common mode resonance radiating from the antenna can interfere with and alter the phase of the signal on the feed line (also referred to as signal coupling), creating an unbalanced current that degrades the signal strength and reduces antenna efficiency. Thus, antenna performance depends on various interdependent design features.

For instance, TCDAs create a so-called current sheet array (CSA) having a low-profile (e.g., $\sim\lambda_{High}/2$) by using many dipole ports in concert to approximate a flat current distribution across the array. Some CSAs achieve 4:1 bandwidth ratio by introducing capacitive coupling between antenna elements to counter the effect of ground pane inductance. The bandwidth of CSAs can be increased by introducing wideband balanced feeds integrated on a printed circuit board (PCB). Such designs employ baluns, which are devices that interface between unbalanced and balanced signals and are optimized among the various dipole elements. However, baluns are intrinsically lossy and can adversely affect isolation performance over the bandwidth of the antenna. Furthermore, single-ended feeds are not well suited for the close integration needed for DPAs. For example, some integrated transceivers can be differential to accompany the balanced transmission lines on the RF side of integrated transceiver chips. A full differential radio can have common mode currents at the aperture and in between the ports that feed the aperture. As noted above, these common mode currents can greatly reduce the impedance bandwidth.

TCDAs provide certain benefits in certain applications. However, there is typically a trade-off in features between different TCDA designs. For example, TCDAs have interdependent features that must be tuned for application-specific requirements. Thus, while one particular TCDA design may be highly suited for one application—for example, an expanded or extended bandwidth of the aperture—such a design may reduce, for example, platform scalability or compatibility of the TCDA with other DPA chains. Likewise, another TCDA design may be scalable and readily compatible with other DPA chains but may suffer from narrower bandwidth at the aperture.

In some examples, TCDAs include dipole antennas, which are inherently differential antennas with opposing phase signals. Wide bandwidth TCDAs enable the antenna to perform several functions (e.g., transmit and receive several signals across a wide range of frequencies, e.g., >500 MHz) at a single aperture. To achieve these functions efficiently, the antenna should be designed to reduce losses incurred by common mode resonances when the antenna is driven at the power levels associated with those functions. As noted above, a balun can be used to mitigate common mode resonance (such as in a sheet array); however, a balun changes the signal from balanced to single-ended (e.g., non-linear) and thus affects the ability of the antenna to perform as efficiently across a wide bandwidth.

Thus, there is a need for a TCDA antenna that is easily scalable and has a wide or ultra-wide bandwidth without incurring increased losses. Ultra-wideband operation is typically considered to include antenna arrays having a bandwidth ratio of 6:1 or greater, also referred to herein as a technology for transmitting information across a wide bandwidth. Examples of the present disclosure provide a TCDA that does not use a balun and/or a single-ended feed and permits differential (two balanced or complementary) signals to be fed into the antenna.

Example Modular Antenna Array

Figure 5:
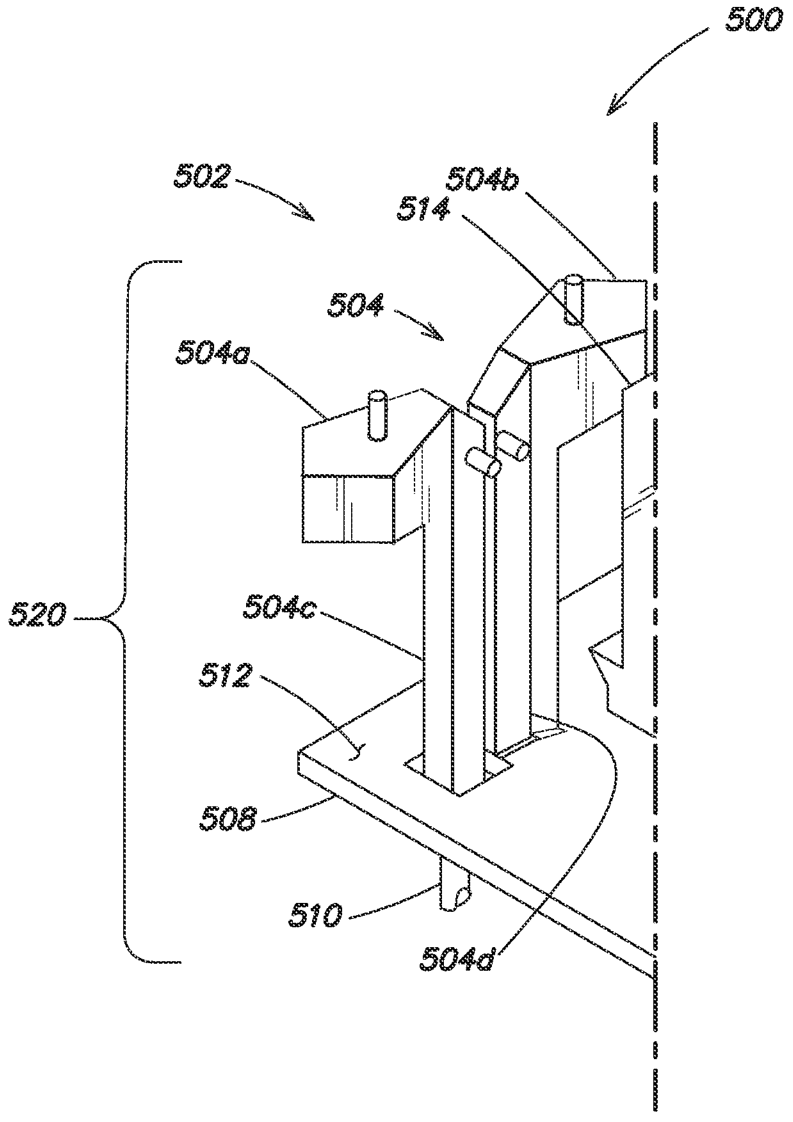
FIG. 5 is a top isometric perspective view of a modular antenna, according to an example of the present disclosure.

FIG. 5 is a top isometric perspective view of a modular antenna 500, according to an example of the present disclosure. The modular antenna 500 includes a 1×1 unit cell 502. In some examples, the unit cell 502 is similar to the unit cell 202 of FIGS. 2A-C. The modular antenna 500 can, in some examples, include multiple unit cells arrayed together, such as 3×3, 6×6, etc., where each unit cell is similar to the 1×1 unit cell 502 shown in FIG. 4. In any event, the modular antenna 500 includes one or more 1×1 unit cells 502.

The unit cell 502 includes an antenna element 504, a ground plane 508, and at least one antenna feed 510. In some examples, the surface of the frame cap 108 or other portion of the frame 104 of FIGS. 1A-B and 2A-C functions as the ground plane 508. The at least one antenna feed 510 is configured to receive a signal over a wide bandwidth. Each antenna element 504 in the array includes a first conductive dipole arm 504*a* and a second conductive dipole arm 504*b*. The first conductive dipole arm 504*a* and the second conductive dipole arm 504*b* are each in planar alignment with a surface 512 of the ground plane 508. In some examples, the first conductive dipole arm 504*a* is a mirror image of the second conductive dipole arm 504*b* about a longitudinal axis extending perpendicular to the surface 512 of the ground plane 508, such that the first conductive dipole arm 504*a* is adjacent to the second conductive dipole arm 504*b*. Each antenna element 504 further includes a first feedline 504*c* in electrical communication with the first conductive dipole arm 504*a* and the antenna feed 510, and a second feedline 504*d* in electrical communication with the second conductive dipole arm 504*b* and the antenna feed 510 (in a balanced configuration) or the ground plane 508 (in an unbalanced configuration).

The unit cell 502 further includes a shorting arm 514 in electrical communication with the ground plane 508 and the first conductive dipole arm 504*a* (as shown in FIG. 5) and/or the second conductive dipole arm 506. The shorting arm 514 can include a common mode mitigation element that is a conductive element or conductor that electrically couples the first and/or second dipole arms 504*a* and/or 506*b* to the ground plane 508, which can be, for example, the frame cap 108 of FIGS. 1A-B and 2A-B. The shorting arm 514 can prevent coupling and resonance between neighboring elements (e.g., adjacent unit cells 502) without using a differential feed, a balun, or additional components.

In general, the modular antenna 500, including one or more unit cells 502 or portions thereof, is printed or otherwise fabricated using additive manufacturing techniques. It will be understood that any number of the unit cells 502 can be fabricated in the disclosed manner, for example, as component arrays (i.e., a single unit cell 502), blocks of sub-arrays (i.e., multiple adjacent unit cells 502), or complete arrays of the unit cells 502.

In operation, a signal, such as an analog RF signal, can propagate between the first conductive dipole arm 504*a* and the antenna feed 510 via the first feedline 504*c*. The signal can further propagate between the second conductive dipole arm 504*b* and the antenna feed 510 via the second feedline 504*d*.

In some examples, the unit cell 502, or an array of unit cells 502, is covered by a superstrate 116 or another overlay material, such as shown in FIG. 1B. The superstrate 116 can include dielectric or other impedance matching materials to provide physical protection and temperature resilience for the aperture antenna array 102, 500, and/or to increase power transfer and reduce signal reflection into and out of the aperture antenna array 102, 500.

The modular antenna 500 and certain other structural or sacrificial components are constructed or fabricated by additively depositing or printing material to form the various structures of the antenna, such that the product is formed from a single piece of continuous material, also referred to as an integral element 520. The integral element 520 includes, for example, the antenna element 504 and the shorting arm 514. In some examples, the material is at least partially electrically conductive (e.g., it is all metal or at least partially metal). In some other examples, the material is at least partially non-conductive and at least partially plated with another conductive material (e.g., a metal plating). In some other examples, the material is dielectrically controlled.

Figure 6:
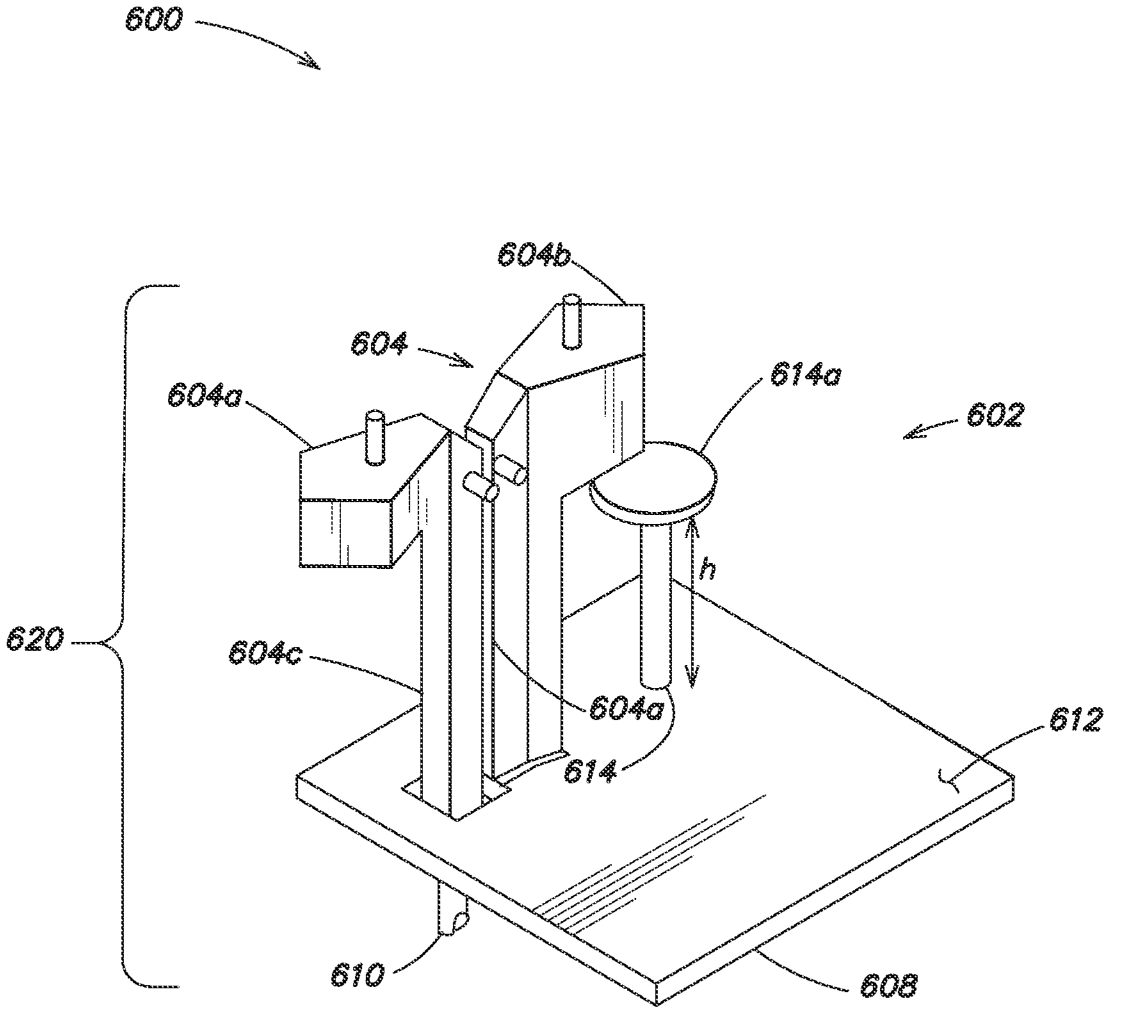
FIG. 6 is a top isometric perspective view of a modular antenna, according to another example of the present disclosure.

FIG. 6 is atop isometric perspective view of a modular antenna 600, according to another example of the present disclosure. The antenna 600 includes a 1×1 unit cell 602. The antenna 600 can, in some examples, include multiple unit cells arrayed together, such as 3×3, 6×6, etc., where each unit cell is similar to the lxi unit cell 602 shown in FIG. 6. In any event, the antenna 600 includes one or more lxi unit cells 602.

Referring to FIG. 6, the unit cell 602 includes an antenna element 604, a ground plane 608, and at least one single-ended antenna feed 610. For example, FIG. 6 shows a modular antenna 600 with a unit cell 602 including a single antenna element 604 for single linear polarization, in accordance with an example of the present disclosure. In some other examples, the unit cell can include two antenna elements (e.g., two orthogonal arrays) for dual polarization. The single-ended antenna feed 610 is configured to receive a single-ended (unbalanced) signal. The antenna element 604 includes a first conductive dipole arm 604*a* and a second conductive dipole arm 604*b*. The first conductive dipole arm 604*a* and the second conductive dipole arm 604*b* are each in planar alignment with a surface 612 of the ground plane 608. In some examples, the first conductive dipole arm 604*a* is a mirror image of the second conductive dipole arm 604*b* about a longitudinal axis extending perpendicular to the surface 612 of the ground plane 608, such that the first conductive dipole arm 604*a* is adjacent to the second conductive dipole arm 604*b*. The antenna element 604 further includes a first feedline 604*c* electrically coupled with the first conductive dipole arm 604*a* and the single-ended antenna feed 610, and a second feedline 604*d* electrically coupled with the second conductive dipole arm 604*b* and the ground plane 608.

The unit cell 602 further includes a conductive wall ("H-wall") 614 electrically coupled with the ground plane 608. The H-wall 614 has an end 614*a* adjacent to, and physically separate from, the second conductive dipole arm 604*b* of the antenna element 604. An axial length/of the H-wall 614 is orthogonal to the ground plane 608. In other words, the H-wall 614 extends orthogonally from the ground plane 608 toward the second conductive dipole arm 604*b* of the antenna element 604. The H-wall 614 does not physically contact the antenna element 604. Rather, the H-wall 614 disrupts the common mode resonances (e.g., the coupled signal between adjacent unit cells 602) that would otherwise cause feed line radiation/coupling and reduce antenna efficiency. The H-wall 614 electrically couples the ground plane to the dipole arm(s). As a result, the H-wall 614 enables efficient radiation from the first and second conductive dipole arms 604*a*, 604*b* without added losses such that a bandwidth ratio of the antenna aperture can reach or exceed 10:1 (e.g., between approximately 2-20 GHz) or greater for single-ended operation while using a single-ended feed and without a balun or other components for mitigating the common mode resonances.

In operation, a signal, such as an analog RF signal, can propagate to the first conductive dipole arm 304*a* from the single-ended antenna feed 610 via the first feedline 604*c*. The second conductive dipole arm 604*b* is grounded to the ground plane 608.

FURTHER EXAMPLE EXAMPLES

The following examples pertain to further examples, from which numerous permutations and configurations will be apparent.

Example 1 provides a device including a frame including a ground plane; and at least one printed circuit board attached to the frame, wherein the at least one printed circuit board includes an integrated aperture antenna array comprising an antenna feed in electrical communication with the at least one printed circuit board, the antenna feed configured to receive a signal over a wide bandwidth; a first conductive dipole arm in planar alignment with a surface of the frame; a second conductive dipole arm in planar alignment with the surface of the frame and adjacent to the first conductive dipole arm; a first feedline in electrical communication with the first conductive dipole arm and the antenna feed; a second feedline in electrical communication with the second conductive dipole arm and the surface of the frame; and at least one of a shorting arm and a conductive wall ("H-wall"), the shorting arm in electrical communication with second conductive dipole arm and the frame, the conductive wall ("H-wall") in electrical communication with the ground plane and having an end adjacent to, and physically separate from, the second conductive dipole arm, an axial length of the H-wall being orthogonal to the ground plane.

Example 2 includes the subject matter of Example 1, further including one or more frame couplers and one or more assembly keys configured to attach the frame, the frame couplers, and the at least one printed circuit board together via one or more threaded holes in the frame.

Example 3 includes the subject matter of any one of Examples 1 and 2, wherein the frame comprises one or more soldering features for soldering the first feedline and the second feedline to the at least one printed circuit board.

Example 4 includes the subject matter of any one of Examples 1-3, wherein the at least one of the shorting arm and the H-wall is a structural support element between the ground plane and the second conductive dipole arm.

Example 5 includes the subject matter of any one of Examples 1-4, wherein the at least one of the shorting arm and the H-wall is electrically conductive.

Example 6 includes the subject matter of any one of Examples 1-5, further including an integral element additively manufactured into a single continuous piece of material, the integral element including the first conductive dipole arm, the second conductive dipole arm, the first feedline, the second feedline, and the at least one of the shorting arm and the H-wall.

Example 7 includes the subject matter of Example 6, wherein the integral element includes an electrically conductive material.

Example 8 includes the subject matter of Example 6, wherein the integral element includes a dielectrically controlled material.

Example 9 includes the subject matter of any one of Examples 1-8, wherein the frame includes at least one opening through which the antenna feed passes.

Example 10 includes the subject matter of Example 9, wherein the at least one opening of the frame is hermetically sealed.

Example 11 provides a device assembly method including constructing a frame including a ground plane, and at least one printed circuit board attached to the frame, additively manufacturing an integral element as a single continuous piece of material, the integral element including an antenna feed in electrical communication with the at least one printed circuit board, the antenna feed configured to receive a signal over a wide bandwidth; a first conductive dipole arm in planar alignment with a surface of the frame; a second conductive dipole arm in planar alignment with the surface of the frame and adjacent to the first conductive dipole arm; a first feedline in electrical communication with the first conductive dipole arm and the antenna feed; a second feedline in electrical communication with the second conductive dipole arm and the surface of the frame; and at least one of a shorting arm and a conductive wall ("H-wall"), the shorting arm in electrical communication with second conductive dipole arm and the frame, the conductive wall ("H-wall") in electrical communication with the ground plane and having an end adjacent to, and physically separate from, the second conductive dipole arm, an axial length of the H-wall being orthogonal to the ground plane.

Example 12 includes the subject matter of Example 11, further including constructing one or more frame couplers and one or more assembly keys configured to attach the frame, the frame couplers, and the at least one printed circuit board together via one or more threaded holes in the frame.

Example 13 includes the subject matter of any one of Examples 11 and 12, further including constructing one or more soldering features on the frame for soldering the first feedline and the second feedline to the at least one printed circuit board.

Example 14 includes the subject matter of any one of Examples 11-13, wherein the at least one of the shorting arm and the H-wall is a structural support element between the ground plane and the second conductive dipole arm.

Example 15 includes the subject matter of any one of Examples 11-14, wherein the at least one of the shorting arm and the H-wall is electrically conductive.

Example 16 includes the subject matter of any one of Examples 11-15, wherein the integral element includes an electrically conductive material.

Example 17 includes the subject matter of any one of Examples 11-16, wherein the integral element includes a dielectrically controlled material.

Example 18 includes the subject matter of any one of Examples 11-17, wherein the frame includes at least one opening through which the antenna feed passes.

Example 19 includes the subject matter of Example 18, further including hermetically sealing the at least one opening of the frame.

Example 20 includes the subject matter of any one of Examples 11-19, further including constructing a superstrate over the integral element.

Example 21 includes the subject matter of any one of Examples 11-20, further including attaching or printing a surface mounted technology (SMT) component in a recess of the frame.

Example 22 includes the subject matter of any one of Examples 11-21, further including additively manufacturing a plurality of the integral elements adjacent to each other.

Numerous specific details have been set forth herein to provide a thorough understanding of the examples. It will be understood, however, that other examples may be practiced without these specific details, or otherwise with a different set of details. It will be further appreciated that the specific structural and functional details disclosed herein are representative of examples and are not necessarily intended to limit the scope of the present disclosure. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims. Furthermore, examples described herein may include other elements and components not specifically described, such as electrical connections, signal transmitters and receivers, processors, or other suitable components for operation of the modular antenna.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and examples have been described herein. The features, aspects, and examples are susceptible to combination with one another as well as to variation and modification, as will be appreciated in light of this disclosure. The present disclosure should, therefore, be considered to encompass such combinations, variations, and modifications. It is intended that the scope of the present disclosure be limited not by this detailed description, but rather by the claims appended hereto. Future filed applications claiming priority to this application may claim the disclosed subject matter in a different manner and may generally include any set of one or more elements as variously disclosed or otherwise demonstrated herein.

What is claimed is:

1. A device comprising:

a frame including a ground plane; and at least one printed circuit board attached to the frame, wherein the at least one printed circuit board includes an integrated aperture antenna array comprising an antenna feed in electrical communication with the at least one printed circuit board, the antenna feed configured to receive a signal over a wide bandwidth;

a first conductive dipole arm in planar alignment with a surface of the frame;

a second conductive dipole arm in planar alignment with the surface of the frame and adjacent to the first conductive dipole arm;

a first feedline in electrical communication with the first conductive dipole arm and the antenna feed;

a second feedline in electrical communication with the second conductive dipole arm and the surface of the frame;

at least one of a shorting arm and a conductive wall ("H-wall"), the shorting arm in electrical communication with second conductive dipole arm and the frame, the conductive wall ("H-wall") in electrical communication with the ground plane and having an end adjacent to, and physically separate from, the second conductive dipole arm, an axial length of the H-wall being orthogonal to the ground plane; and one or more frame couplers and one or more assembly keys configured to attach the frame, the frame couplers, and the at least one printed circuit board together via one or more threaded holes in the frame.

2. The device of claim 1, wherein the frame comprises one or more soldering features for soldering the first feedline and the second feedline to the at least one printed circuit board.

3. The device of claim 1, wherein the at least one of the shorting arm and the H-wall is a structural support element between the ground plane and the second conductive dipole arm.

4. The device of claim 1, further comprising an integral element additively manufactured into a single continuous piece of material, the integral element including the first conductive dipole arm, the second conductive dipole arm, the first feedline, the second feedline, and the at least one of the shorting arm and the H-wall.

5. The device of claim 4, wherein the integral element includes an electrically conductive material.

6. The device of claim 4, wherein the integral element includes a dielectrically controlled material.

7. The device of claim 1, wherein the frame includes at least one opening through which the antenna feed passes.

8. The device of claim 7, wherein the at least one opening of the frame is hermetically sealed.

* * * * *